(12) United States Patent
Chutorash

(10) Patent No.: US 6,542,182 B1
(45) Date of Patent: Apr. 1, 2003

(54) SYSTEM FOR DISPLAYING AN AREA OUTSIDE A NORMAL VIEWING AREA TO A VEHICLE DRIVER

(75) Inventor: Richard J. Chutorash, Rochester, MI (US)

(73) Assignee: Lear Corporation, Southfield, MI (US)

( * ) Notice: Subject to any disclaimer, the term of this patent is extended or adjusted under 35 U.S.C. 154(b) by 329 days.

(21) Appl. No.: 09/717,750

(22) Filed: Nov. 21, 2000

(51) Int. Cl.⁷ .......................... H04N 7/18; H04N 9/47
(52) U.S. Cl. ................................ 348/148; 348/159
(58) Field of Search ........................ 348/148, 151, 348/153, 159; 359/601–608; 340/815.4, 425.5, 901, 433, 435, 436; 381/86, 110, 365; H04N 7/18, 9/47

(56) References Cited

U.S. PATENT DOCUMENTS

| | | |
|---|---|---|
| 5,382,953 A | 1/1995 | Hauptli |
| 5,555,019 A | 9/1996 | Dole |
| 5,574,443 A | 11/1996 | Hsieh |
| 5,642,238 A | 6/1997 | Sala |
| 5,680,123 A | 10/1997 | Lee |
| 5,760,848 A * | 6/1998 | Cho ............................ 348/839 |
| 5,760,962 A | 6/1998 | Schofield et al. |
| 5,793,420 A | 8/1998 | Schmidt |
| 5,940,120 A | 8/1999 | Frankhouse et al. |
| 5,956,079 A | 9/1999 | Ridgley |
| 5,978,017 A | 11/1999 | Tino |
| 6,008,841 A | 12/1999 | Charlson |
| 6,259,475 B1 * | 7/2001 | Ramachandran et al. ... 348/148 |

FOREIGN PATENT DOCUMENTS

| | | | | |
|---|---|---|---|---|
| JP | 11-298887 | * | 10/1999 | ............ H04N/7/18 |
| WO | WO 99/43251 | * | 8/1999 | ........... H04N/5/225 |

* cited by examiner

Primary Examiner—Nhon Diep
(74) Attorney, Agent, or Firm—Brooks & Kushman P.C.

(57) ABSTRACT

A system including a self-powered, mobile camera unit is provided for displaying an area outside a normal viewing area to a vehicle driver. The camera unit includes a camera for generating images of objects, a camera control unit for controlling the camera, a camera transceiver unit coupled to the camera control unit for wirelessly transmitting the images and a first plurality of docking connectors coupled to the camera control unit. The system also includes a vehicle transceiver unit for wirelessly receiving the transmitted images, a vehicle control unit coupled to the vehicle transceiver unit, a display coupled to the vehicle control unit for displaying the received images inside the normal viewing area of the vehicle driver, and a second plurality of docking connectors removably interconnected, both physically and electrically, to the first plurality of docking connectors at a docking station and coupled to the vehicle control unit. The first and second plurality of docking connectors couple camera control signals from the vehicle control unit to the camera control unit when the first and second plurality of docking connectors are physically and electrically interconnected. The camera control signals are wirelessly transmitted by the vehicle transceiver unit and wirelessly received by the camera transceiver unit when the camera unit is removed from the docking station.

13 Claims, 3 Drawing Sheets

SYSTEM FOR DISPLAYING AN AREA OUTSIDE A NORMAL VIEWING AREA TO A VEHICLE DRIVER

TECHNICAL FIELD

This invention relates to a system for displaying an area outside a normal viewing area to a vehicle driver.

BACKGROUND ART

Camera systems are beginning to appear in motor vehicles for safety/security reasons including rear view blind spot, night vision, rear passenger monitoring, etc. These systems are "hard-wired" to the motor vehicle.

U.S. Pat. No. 6,008,841 discloses a security system for a public transportation vehicle including a plurality of mounted cameras inside and outside for observing internal and external activity.

U.S. Pat. No. 5,956,079 discloses a monitoring system for a tractor and the like including a video camera facing the rear of the vehicle and a monitor facing the driver.

U.S. Pat. No. 5,940,120 discloses a combination vanity console and video imaging device including a mirror with means for controlling reflected light and video cameras.

U.S. Pat. No. 5,642,238 discloses a vision enhancement system for a vehicle including video images reflected on a mirror for a rearview mirror.

U.S. Pat. No. 5,574,443 discloses a vehicle monitoring apparatus including three video cameras mounted on vehicles, one pointing rearward and one to each side, plus a display, CRT, mounted on a vehicle's dashboard.

U.S. Pat. No. 5,978,017 discloses a video recording system for a vehicle including four cameras with fisheye lenses having one pointing to front, rear driver and front seat and means for switching between the four.

U.S. Pat. No. 5,793,420 discloses a vehicle video recording system including three video cameras and means for directing signals to a recorder or to a monitor, the system being triggered by a vehicle turn signal.

U.S. Pat. No. 5,680,123 discloses a vehicle monitoring system including three video cameras mounted on sides and rear pointing to rearward plus a recorder and a display unit to detect objects not readily seen by a driver.

U.S. Pat. No. 5,382,953 discloses a camera system for recording school bus violations including means for detecting vehicle motions in a violation zone and camera for recording vehicle.

U.S. Pat. No. 5,760,962 discloses an automatic rearview mirror system including a photosensor array as means of controlling the amount of light reflected by a mirror.

U.S. Pat. No. 5,555,019 discloses a radio-controlled vehicle includes a video camera for transmitting real-time video images and a vehicle wireless transmitter and receiver.

DISCLOSURE OF INVENTION

An object of the present invention is to provide an improved system for displaying an area outside a normal viewing area to a vehicle driver.

In carrying out the above object and other objects of the present invention, a system is provided for displaying an area outside a normal viewing area to a vehicle driver. The system includes a self-powered, mobile camera unit including a camera for generating images of objects, a camera control unit for controlling the camera, a camera transceiver unit coupled to the camera control unit for wirelessly transmitting the images and a first plurality of docking connectors coupled to the camera control unit. The system also includes a vehicle transceiver unit for wirelessly receiving the transmitted images, a vehicle control unit coupled to the vehicle transceiver unit, a display coupled to the vehicle control unit for displaying the received images inside the normal viewing area of the vehicle driver, and a second plurality of docking connectors removably interconnected, both physically and electrically, to the first plurality of docking connectors at a docking station and coupled to the vehicle control unit. The first and second plurality of docking connectors couple camera control signals from the vehicle control unit to the camera control unit when the first and second plurality of docking connectors are physically and electrically interconnected. The camera control signals are wirelessly transmitted by the vehicle transceiver unit and wirelessly received by the camera transceiver unit when the camera unit is removed from the docking station.

The camera control signals may include on and off signals for turning the camera on and off, respectively.

The camera may include a zoom lens wherein the camera control signals include a zoom control signal for controlling the zoom lens.

The camera unit may include at least one motor coupled to the camera wherein the camera control signals include at least one motor control signal for controlling movement of the camera.

The camera unit may include a tilt motor and a scan motor both coupled to the camera wherein the camera control signals include motor control signals for controlling tilt and scan of the camera.

The system may further include a manually-operable driver control unit coupled to the vehicle control unit for generating the camera control signals.

The camera unit may include a battery coupled to the camera control unit for powering the camera unit. The battery may be a rechargeable battery wherein the first and second plurality of docking connectors couple power signals to the camera unit to recharge the rechargeable battery at the docking station.

The camera unit may include a housing for housing the camera, the camera control unit, the camera transceiver unit and the first plurality of docking connectors.

The system may further include a mechanism for removably mounting the camera unit to a vehicle or a trailer. The mechanism may include at least one suction cup, at least one magnet or at least one pair of hold downs.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
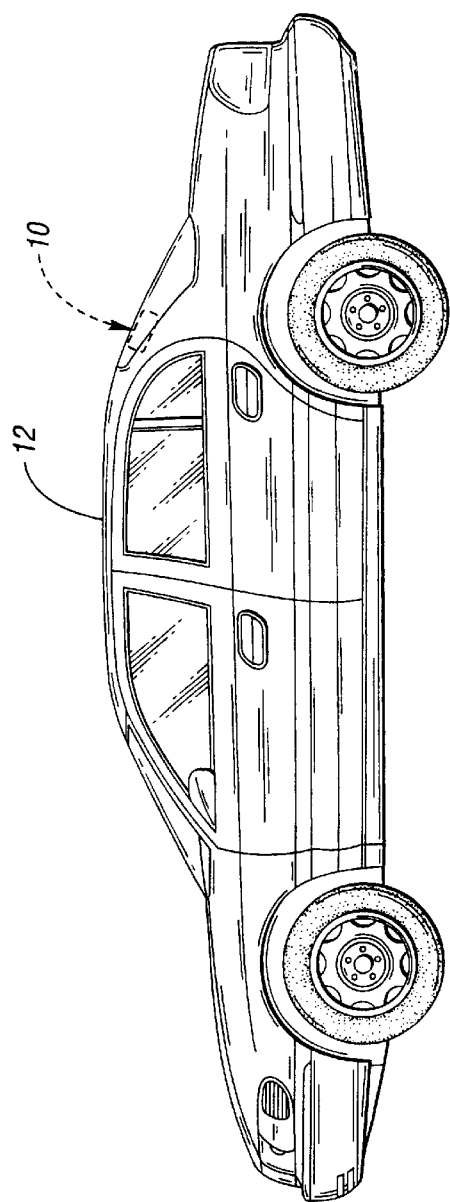
FIG. 1 is a side view of an automobile with a camera unit of the present invention shown by phantom lines in a docked position at a docking station within the vehicle.
Figure 2:
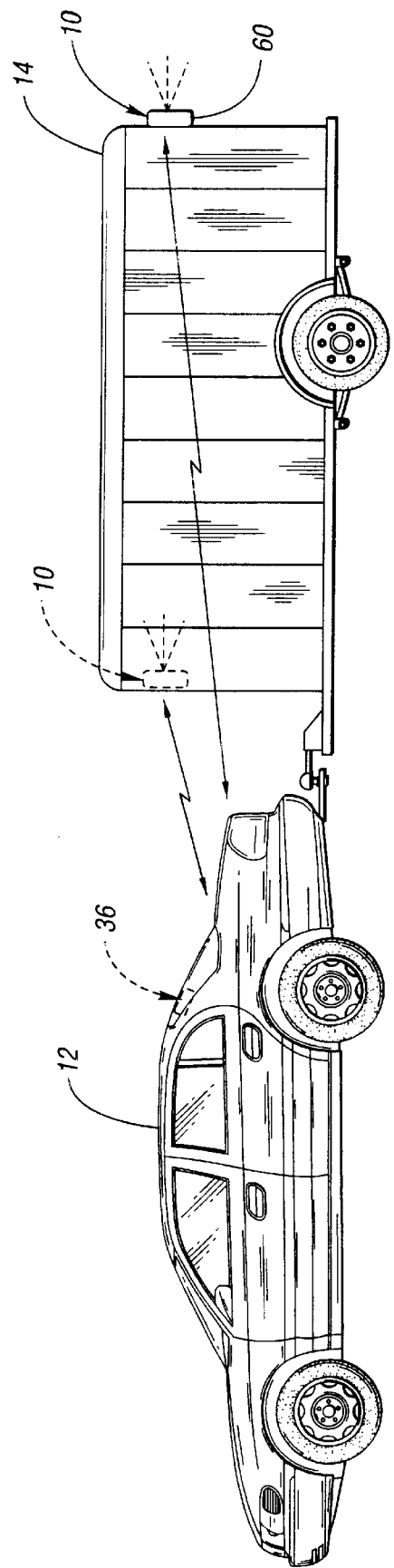
FIG. 2 is a side view of the automobile of FIG. 1 pulling a trailer with an undocked camera unit shown within the trailer by phantom lines and at the rear of the trailer by solid lines, and illustrating wireless communications with the rest of the system of the present invention located on the automobile.

In general, and referring to FIGS. 1 and 2, the system of the present invention includes a camera unit, generally indicated at 10, that has wireless signal transmission capability with self-powered components (battery/recharge). The camera unit 10 may be docked in one location on and/or in a motor vehicle 12, as shown in FIG. 1, and later moved to another location, as shown in FIG. 2. The camera unit 10 may be removably mounted at the rear of a trailer 14 (boat, etc.), which is typically outside the normal viewing area of the driver or even in the trailer 14 (for viewing towed animals such as horses, etc.).

A self-fastening system (like magnets 16 in FIG. 5) could be employed to fix the movable camera unit 10. A display 18 in FIG. 3 for the camera unit 10 could be located within the viewing area of the driver (in or on the instrument panel or by the rear view mirrors of the vehicle 12).

With further reference to FIG. 1, the camera unit 10 is shown in its docked position at a docking station (generally indicated at 36 in FIG. 2) connected directly to the vehicle 12 to receive power (charging) and control signals.

With further reference to FIG. 2, the camera unit 10 is shown in "undocked", temporary positions on the trailer 14. The camera unit 10 wirelessly communicates with the rest of the system in the vehicle 12. The wireless communications include picture transmissions to the vehicle 12 as well as the reception of control signals from the rest of the system in the vehicle 12, as described in greater detail hereinbelow.

Figure 3:
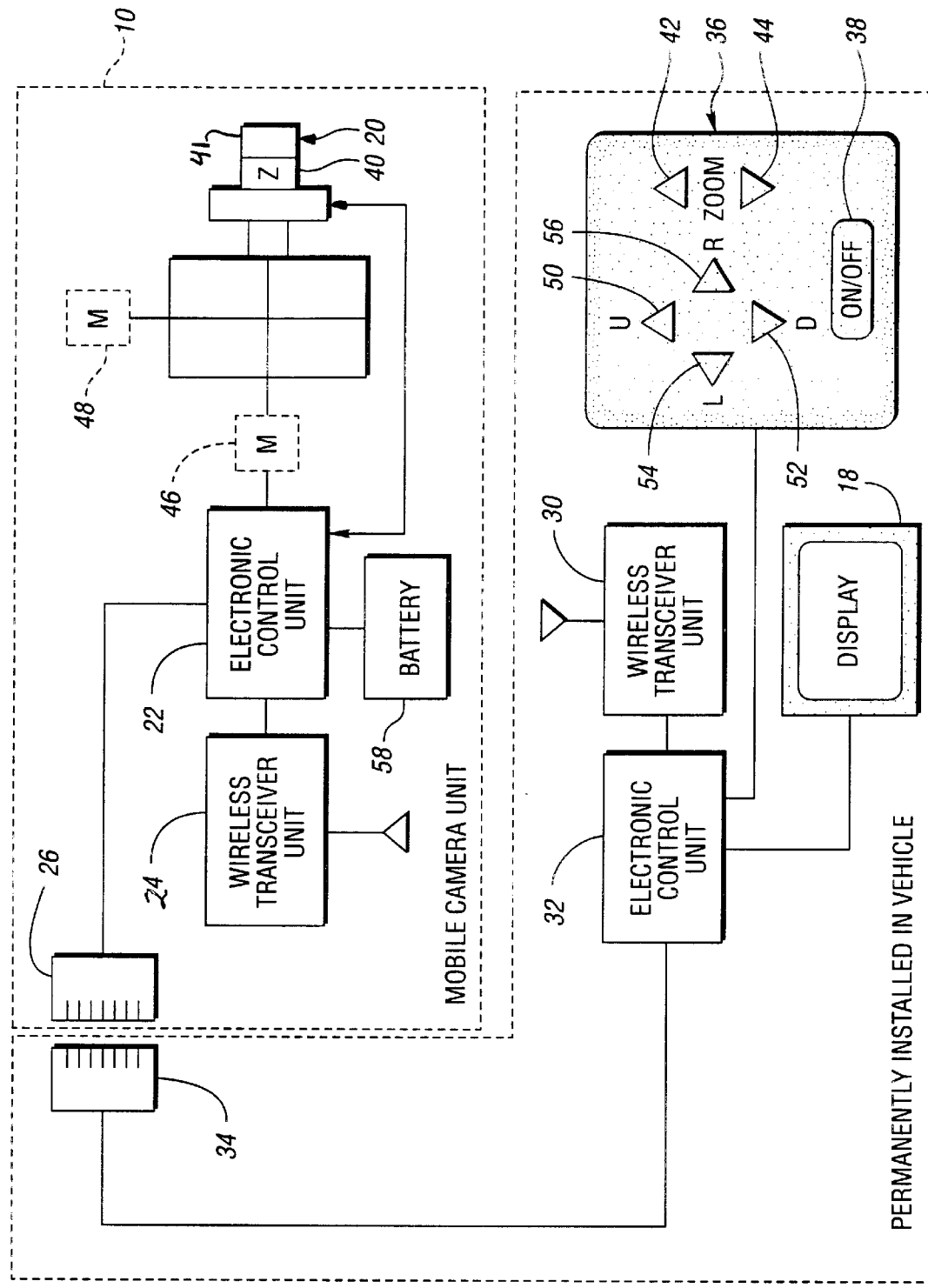
FIG. 3 is a schematic block diagram of the system of the present invention with the camera unit in its docked position.

Referring now to FIG. 3, the system of the present invention for displaying an area outside a normal viewing area to a vehicle driver is illustrated. The system includes the self-powered, mobile camera unit 10 which, in turn, includes an electronic, digital camera, generally indicated at 20, for generating video images of objects. The camera 20 may sense infrared and/or visible light. A camera control unit 22 controls the camera 20 and a camera transceiver unit 24 coupled to the camera control unit 22 wirelessly transmits the images. The transceiver unit 24 may transmit the images at about 2.4 GHz. However, other frequencies are also possible. A first plurality of docking connectors 26 coupled to the camera control unit 22 allow power and control signals to be received by the camera unit 10 when the unit 10 is docked.

Permanently installed in the vehicle 12, the system includes a vehicle transceiver unit 30 for wirelessly receiving the transmitted images. A vehicle control unit 32 is coupled to the vehicle transceiver unit 30. The display 18 is coupled to the vehicle control unit 32 for displaying the received images inside the normal viewing area of the vehicle driver. The system further includes a second plurality of docking connectors 34 removably interconnected, both physically and electrically, to the first plurality of docking connectors 26 at the docking station 36, as illustrated in FIG. 2, and coupled to the vehicle control unit 32. The first and second plurality of docking connectors 26 and 34, respectively, couple camera control signals from the vehicle control unit 32 to the camera control unit 22 when the first and second plurality of docking connectors 26 and 34, respectively, are physically and electrically interconnected. By contrast, the camera control signals are wirelessly transmitted by the vehicle transceiver unit 30 and wirelessly received by the camera transceiver unit 24 when the camera unit 10 is removed from the docking station 36, as illustrated in FIG. 2.

The system also includes a manually-operable driver control unit, generally indicated at 36, coupled to the vehicle control unit 32 for generating the camera control signals. The camera control signals include "on" and "off" signals for turning the camera 20 "on" and "off", respectively, as provided by on/off button switch 38.

The camera 20 also includes a zoom control 40 for controlling a lens 41 of the camera 20. The camera control signals include a zoom control signal for controlling the zoom lens 41, as indicated by "zoom-in" button switch 42 and "zoom-out" button switch 44 on the control unit 36.

The camera unit 10 optionally includes at least one motor 46 or 48 coupled to the camera 20 and the camera control unit 22. The camera control signals then include at least one motor control signal for controlling movement of the camera 20. The camera unit 10 may include a tilt motor 46 and a scan motor 48 both coupled to the camera 20. The camera control signals include motor control signals for controlling tilt and scan of the camera 20, as indicated by up and down button switches 50 and 52, respectively, and left and right button switches 54 and 56, respectively, on the control unit 36.

The camera unit 10 also preferably includes a battery 58 coupled to the camera control unit 22 for powering the camera unit 10. The battery 58 is preferably a rechargeable battery. The first and second plurality of docking connectors 26 and 36, respectively, couple power signals to the camera unit 10 to recharge the rechargeable battery 58 at the docking station 36.

Figure 4:
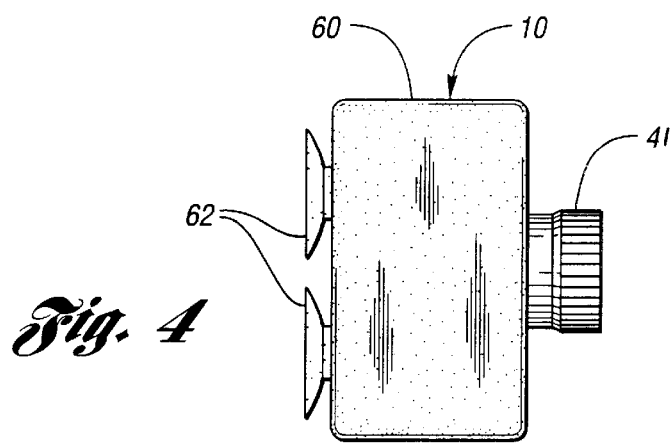
FIG. 4 is a side elevational view of the camera unit and its housing with suction cups for removably mounting the camera unit to either an automobile or a trailer being pulled by the automobile.
Figure 5:
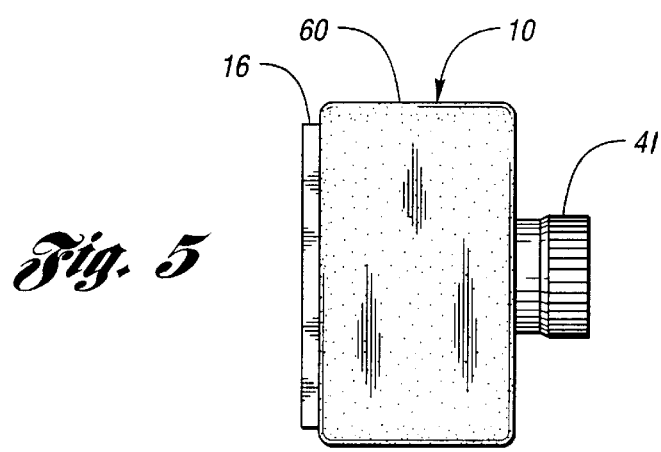
FIG. 5 is a view similar to FIG. 4 but showing magnets for removably mounting the camera unit.
Figure 6:
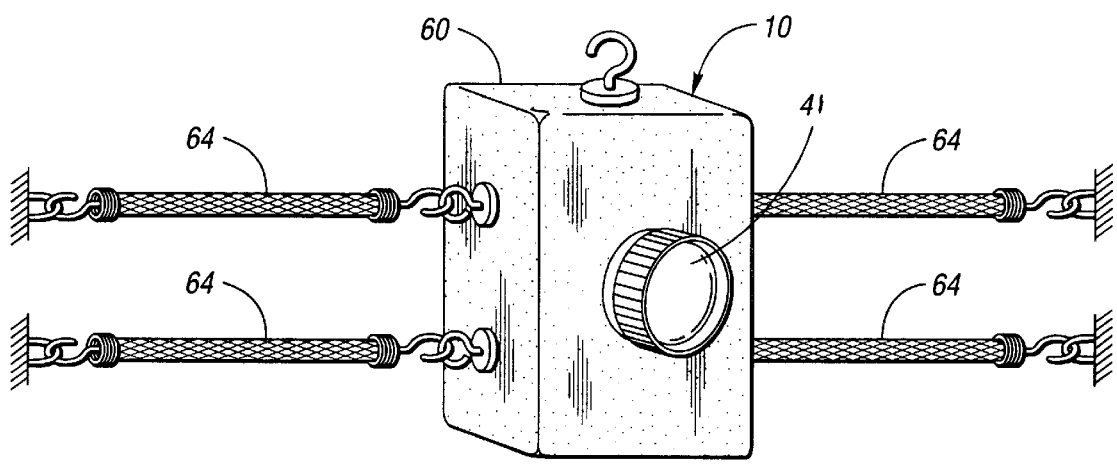
FIG. 6 is a perspective view of the camera unit and its housing of FIGS. 4 and 5, but showing two pairs of bungee hold downs and a hook for removably mounting the camera unit.

Referring now to FIGS. 4–6, the camera unit 10 also includes a housing 60 for housing the camera 20, the camera control unit 22, the camera transceiver unit 24, the first plurality of docking connectors 26, the battery 58, the motors 46 and 48, and the zoom lens 40.

The system further includes a means or mechanism for removably mounting the camera unit 10 at the housing 60 to the vehicle 12 or the trailer 14 pulled by the vehicle 12.

The mechanism may include one or more suction cups 62, as shown in FIG. 4, one or more of the magnets 16 as shown in FIG. 5, or one or more pairs of bungee hold downs 64 as shown in FIG. 6.

Other mechanisms for removably mounting the housing include, but are not limited to, Velcro or hooks with adjustable straps (which may cooperate with lips and/or flanges of the vehicle 12 or trailer 14). Also, damping and/or cushioning material may be provided between the housing 60 and the vehicle 12 or the trailer 14 to minimize shock and vibration effects on the camera unit 10.

While the best mode for carrying out the invention has been described in detail, those familiar with the art to which this invention relates will recognize various alternative designs and embodiments for practicing the invention as defined by the following claims.

What is claimed is:

1. A system for displaying an area outside a normal viewing area to a vehicle driver, the system comprising:

a self-powered, mobile camera unit including a camera for generating images of objects, a camera control unit for controlling the camera, a camera transceiver unit coupled to the camera control unit for wirelessly transmitting the images and a first plurality of docking connectors coupled to the camera control unit;

a vehicle transceiver unit for wirelessly receiving the transmitted images;

a vehicle control unit coupled to the vehicle transceiver unit;

a display coupled to the vehicle control unit for displaying the received images inside the normal viewing area of the vehicle driver; and a second plurality of docking connectors removably interconnected, both physically and electrically, to the first plurality of docking connectors at a docking station and coupled to the vehicle control unit wherein the first and second plurality of docking connectors couple camera control signals from the vehicle control unit to the camera control unit when the first and second plurality of docking connectors are physically and electrically interconnected and wherein the camera control signals are wirelessly transmitted by the vehicle transceiver unit and wirelessly received by the camera transceiver unit when the camera unit is removed from the docking station.

2. The system as claimed in claim 1 wherein the camera control signals include on and off signals for turning the camera on and off, respectively.

3. The system as claimed in claim 1 wherein the camera includes a zoom lens and wherein the camera control signals include a zoom control signal for controlling the zoom lens.

4. The system as claimed in claim 1 wherein the camera unit includes at least one motor coupled to the camera and wherein the camera control signals include at least one motor control signal for controlling movement of the camera.

5. The system as claimed in claim 4 wherein the camera unit includes a tilt motor and a scan motor both coupled to the camera and wherein the camera control signals include motor control signals for controlling tilt and scan of the camera.

6. The system as claimed in claim 1 further comprising a manually-operable driver control unit coupled to the vehicle control unit for generating the camera control signals.

7. The system as claimed in claim 1 wherein the camera unit includes a battery coupled to the camera control unit for powering the camera unit.

8. The system as claimed in claim 1 wherein the battery is a rechargeable battery and wherein the first and second plurality of docking connectors couple power signals to the camera unit to recharge the rechargeable battery at the docking station.

9. The system as claimed in claim 1 wherein the camera unit includes a housing for housing the camera, the camera control unit, the camera transceiver unit and the first plurality of docking connectors.

10. The system as claimed in claim 9 further comprising means for removably mounting the camera unit to a vehicle or a trailer.

11. The system as claimed in claim 10 wherein the means for removably mounting includes at least one suction cup.

12. The system as claimed in claim 10 wherein the means for removably mounting includes at least one magnet.

13. The system as claimed in claim 10 wherein the means for removably mounting includes at least one pair of hold downs.

* * * * *